(12) United States Patent
Spann et al.

(10) Patent No.: US 6,466,248 B1
(45) Date of Patent: Oct. 15, 2002

(54) VIDEOCONFERENCE RECORDING

(75) Inventors: Michael Spann, Coleta, CA (US); Chuck House, Mendham, NJ (US)

(73) Assignee: Dialogic Corporation, Parsippany, NJ (US)

( * ) Notice: Subject to any disclaimer, the term of this patent is extended or adjusted under 35 U.S.C. 154(b) by 0 days.

(21) Appl. No.: 09/543,299

(22) Filed: Apr. 5, 2000

(51) Int. Cl.$^7$ .................................................. H04N 7/14
(52) U.S. Cl. ................................ 348/14.08; 348/14.09; 348/14.13
(58) Field of Search ........................... 348/14.01, 14.02, 348/14.03, 14.04, 14.05, 14.06, 14.07, 14.08, 14.09, 14.1, 14.11, 14.12, 14.13; 370/260, 261; 709/204, 205

(56) References Cited

U.S. PATENT DOCUMENTS 5,963,547 A * 10/1999 O'Neil et al. ................ 370/260

FOREIGN PATENT DOCUMENTS

| JP | 09402058443 A | * | 2/1990 | H04L/12/18 |
| JP | 404192657 A | * | 7/1992 | H04M/11/06 |
| JP | 407111644 A | * | 4/1995 | H04N/7/15 |
| JP | 407162821 A | * | 6/1995 | H04N/7/14 |
| JP | 408023526 A | * | 1/1996 | H04N/7/14 |
| JP | 410285531 A | * | 10/1998 | H04N/5/91 |
| JP | 02000023130 A | * | 1/2000 | H04N/7/15 |

* cited by examiner

*Primary Examiner*—Melur Ramakrishnaiah
(74) *Attorney, Agent, or Firm*—Kaplan & Gilman, LLP

(57) ABSTRACT

A videoconference system in which a first encoder is provided for encoding the original video signal into a first format suitable for streaming transmission, and a second encoder is provided for encoding the original video signal into a second format having a higher quality or less storage as compared to the first format. The first and second encoder works independently to each other and therefore the parameters may be optimized independently.

22 Claims, 3 Drawing Sheets

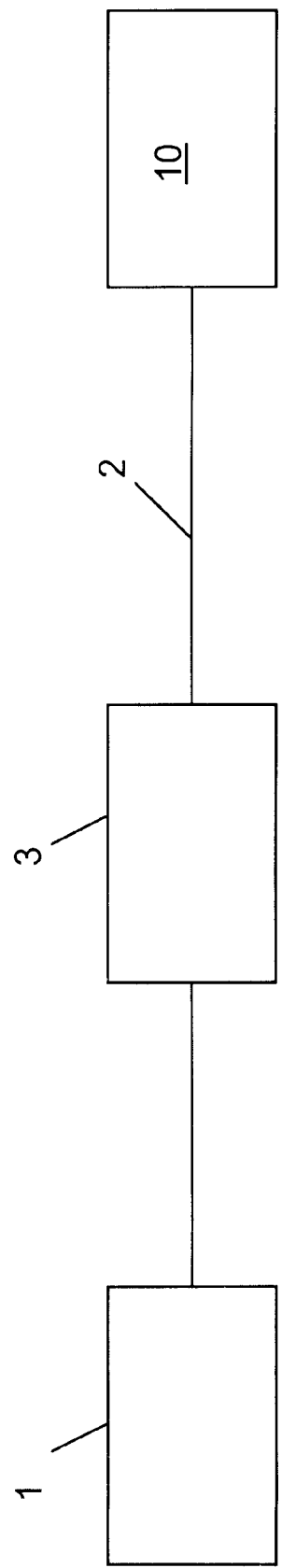

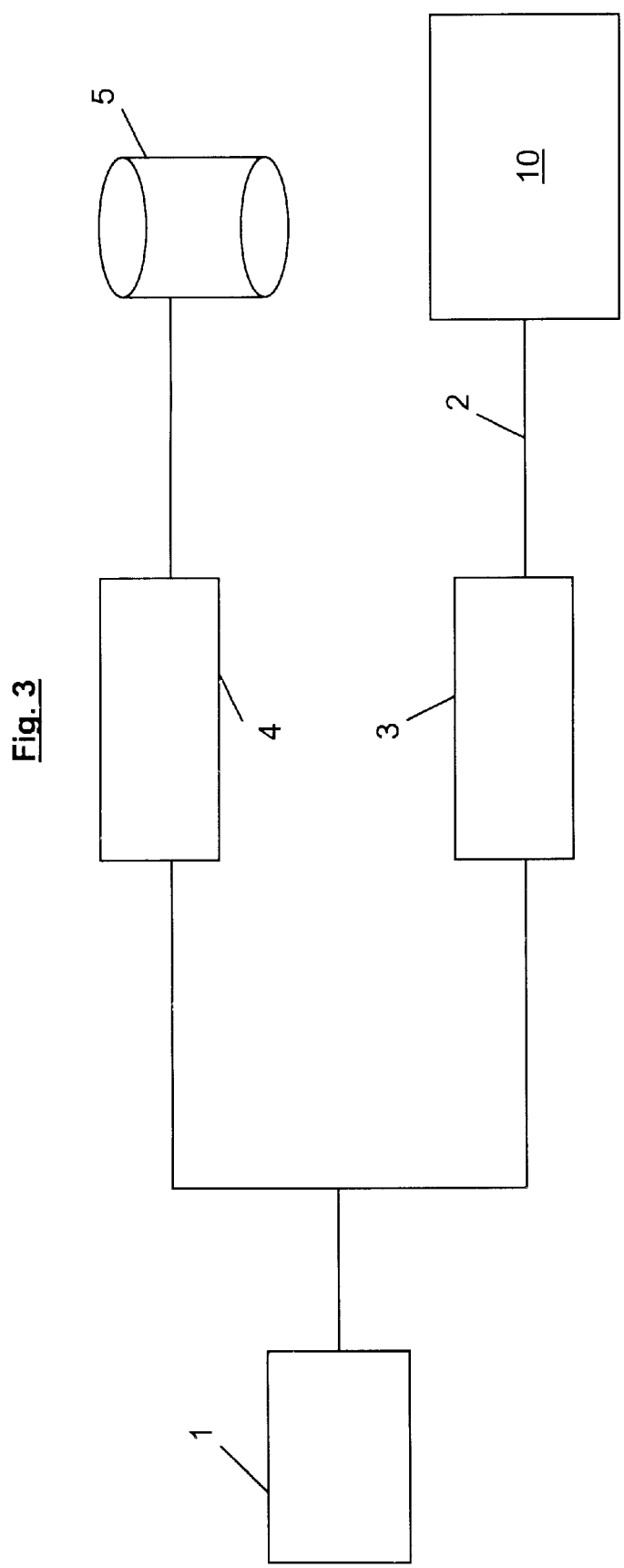

VIDEOCONFERENCE RECORDING

TECHNICAL FIELD

The present invention relates to videoconferencing, and more particularly, to a technique for recording a videoconference during a conference session for future viewing.

BACKGROUND OF THE INVENTION

In a typical videoconference system as illustrated in FIG. 1, a plurality of conference stations 1 communicate with each other through a conference bridge 10 over data network 2. During a videoconference session, each of the conference stations 1 participating in the conference generates a videoconference signal (e.g., from a video camera) and transmits it to the conference bridge 10 which routes the video signal to each of the other conference stations for presentation on terminal screens. For the purpose of viewing the video signal in real time, the original video signal generated from each videoconference station is encoded into a "wire format" before it is transmitted to the conference bridge so that the video images can be streamed to the receiving stations.

Most videoconferences presently in use are implemented using digital techniques. The digital techniques usually involve encoding the information for transmission over a network to other conferees. A variety of encoding algorithms exist, and a trade-off among various parameters is often performed to select the encoding algorithm.

One parameter relevant to selection of the encoding algorithm is latency. Latency refers to a time delay between the transmission of the video image to the receipt of that video image by other conference members. During real time videoconferencing, longer latency is considered a negative. Specifically, high latency means that the images are significantly delayed from the time of transmission, until the time they are viewable by the viewer. This is similar to a satellite delay seen in long distance telephone calls. Moreover, if the latency of the image is different from that of the audio, then the sound will not be synchronized with the lip movement of the speaker, resulting in poor videoconferencing. This problem can occur if the latency for the video is so long that it delays the video by more than the audio.

Unfortunately, if a complex signal processing and image compression algorithm is used that requires long blocks of data to encode and relatively large number of calculations, then for a given fixed processing power, latency will increase. The reason for this limitation is that the more complex the algorithm is, the more time it typically takes to process the signals. If the image compression/encoding algorithm is too complicated, it will take a relatively long time to encode the image and then decode the image at the receiving end. Thus, minimization of latency can only be achieved through less complex image encoding algorithms.

On the other hand, in order to achieve extremely high image quality, it is desirable to use more advanced signal processing and image encoding/decoding algorithms. These advanced algorithms allow very high quality images to be reconstructed even from lower bit rates, which are needed for transmission over the media.

In view of the above, it can be appreciated that the requirements of latency and image quality are, in some sense, conflicting. More specifically, high image quality requires very complex encoding algorithms in order to insure accurate image reconstruction. However, such complex algorithms increase latency, and thus, result in a situation where high delay diminishes the user-friendliness of the system.

In view of the above, there exists a need in the art for an efficient technique to provide an image in a videoconference that is both high quality and low latency.

SUMMARY OF THE INVENTION

The present invention provides a technique of recording a videoconference in which the videoconference can be recorded independently of the real time transmission of the video signal. Thereafter the recorded video can be transmitted to others desiring to review it later. Different encoding mechanisms can be utilized for the real time transmission and the storage for later transmission.

In particular, a first encoder is provided for encoding the original video signal into a first format that is suitable for real time transmission to the conference bridge to be routed to other participating stations, and a second encoder is provided for encoding the original video signal into a second format as desired by the user.

The first and second encoders work independently of each other. The first encoder uses a low latency algorithm for real time transmission of the video signal. This encoder sacrifices some quality to achieve real time transmission with low latency within an allocated bandwidth. The second encoder is used for archival and storage of the image. This second encoder achieves higher quality, at the expense of latency. However, since the second encoder is for storage and later review of the image, latency is not in issue and may be sacrificed, since recording the image after a one or more seconds delay is acceptable.

In an enhanced embodiment, the stored image is associated with a list of conference members and associated network addresses. The higher quality image may then be later transmitted, in non-real time, to conference members, either automatically or at a conference member's request. It is also possible to implement the two encoders using different parameters with, or variations of, the same algorithms.

BRIEF DESCRIPTION OF THE DRAWINGS

FIG. 2 is a schematic illustration of a conventional videoconference station;

FIG. 3 is a schematic illustration of a videoconference station implementing the present invention.

DETAILED DESCRIPTION OF THE PREFERRED EMBODIMENT

Figure 1:
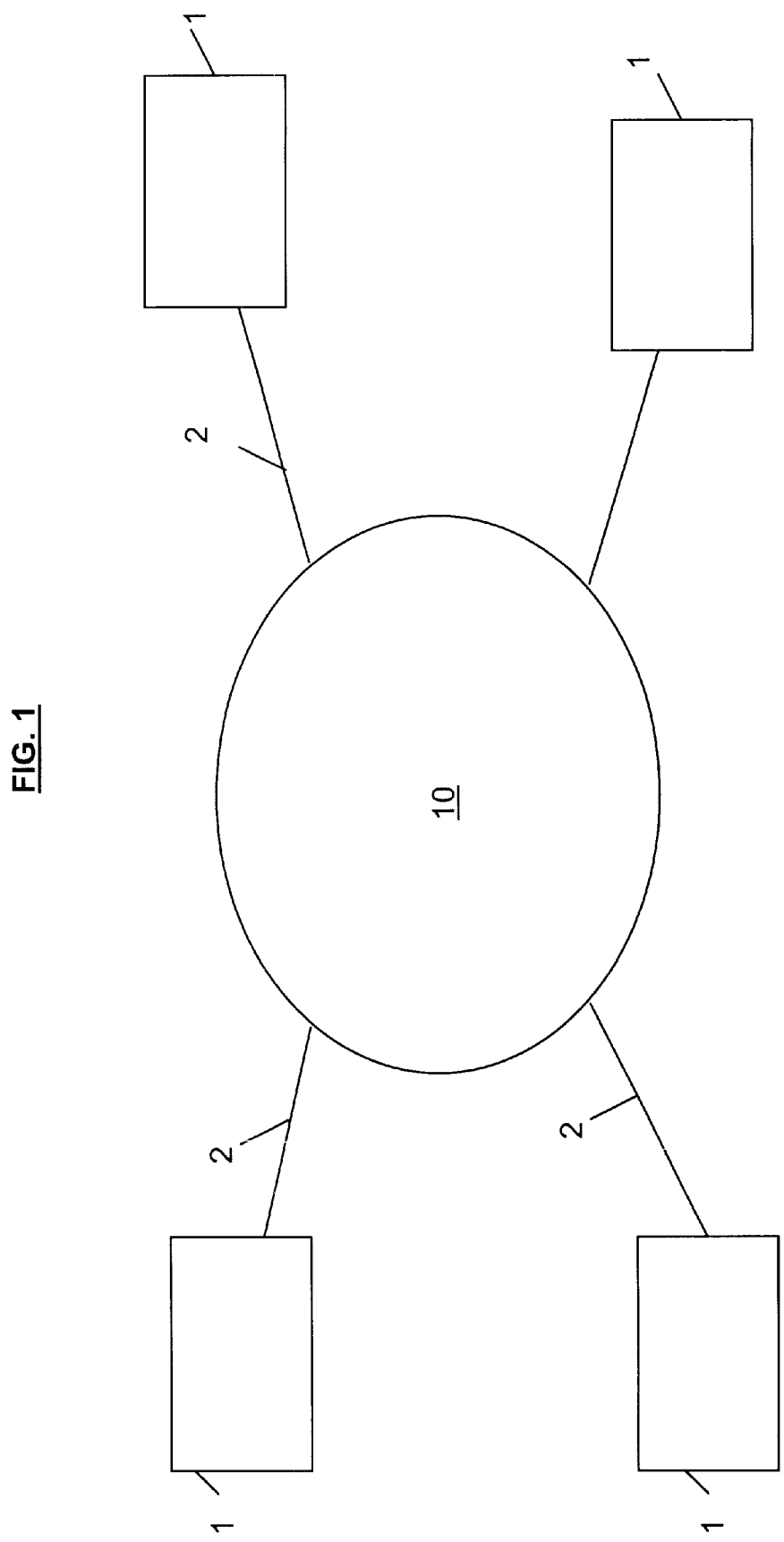
FIG. 1 is a schematic illustration of a typical videoconference system.

Conventionally, as shown in FIG. 1, a plurality of participating videoconference stations 1 communicate with each other through a conference bridge 10. The video signals from each of stations 1 are typically streamed to the conference bridge 10 and further to other participating stations over packet data network 2, e.g., a Local Area Network ("LAN") or other data network such as the Internet.

As illustrated in FIG. 2, for the purpose of communicating the video signal generated at each transmitting station to the receiving stations in real time, the original video signal must be encoded by an encoder 3. Encoder 3 uses a format that is suitable to be transmitted over the packet data network 2 to the conference bridge 10 and further to other participating stations. The encoding technique adopted in the encoder 3 usually sacrifices the quality of transmitted images for a shorter latency so that the video images can be transmitted in real time through a limited bandwidth. Encoder 3 exists internally in each station 1 of FIG. 1, and is illustrated as a separate component in FIG. 2. Although the quality is reasonably acceptable, it is not maximized. Instead, some quality is sacrificed in favor of lower latency. Algorithms for achieving acceptable latency and quality are known to those of skill in the art.

If it is desirable to record the videoconference for future review, an additional station to the conference may be used for such a purpose. Conventionally as shown in FIG. 3, the video signals encoded by the encoder 3 are recorded and saved in a non-volatile storage 5. As explained above, the encoder 3 is the type suitable for producing a video signal in a format that may be broadcast to the conference bridge 10 over the network 2. Therefore, the image quality is usually sacrificed to latency.

In the present invention as illustrated in FIG. 3, a second encoder 4 is provided independently of the encoder 3. The encoder 4 is used specifically for the purpose of recording and archiving of the videoconference in a non-volatile storage 5.

In particular, the encoder 4 encodes the original videoconference signal generated from the conference station 1 into a second format that is of higher quality than that of the first format produced by the encoder 3. Even though the latency of the encoding by the encoder 4 is probably much longer than that of the encoder 3, the latency need not be considered by the encoder 4 for the purpose of recording and archiving of the videoconference.

It is important to be appreciated that the encoder 4 works independently of the encoder 3 and therefore the parameters (such as latency) considered by the encoder 3 for streaming transmission of the video images need not to be considered by the encoder 4.

The recorded videoconference saved in the storage 5 may be transmitted to any other stations upon request or automatically. Because the bandwidth between two stations is usually occupied during a videoconference for the real time transmission, the transmission of the recorded video images may be carried out at a time when the bandwidth is available, e.g., after the videoconference.

One possible enhancement comprises recording the signal at storage 5 along with a record of all of the participants of the particular conference. Specifically, since most conferences are implemented over a data network, it is usually the case that the network addresses of all conference participants are available to the re-transmission of the higher quality stored image may be accomplished in several manners. One way in which this could be accomplished is to have storage 5 maintain a record of conference members and associated network addresses. At a later time after the videoconference, a storage 5 automatically re-transmits the image at higher quality (but higher latency) to all other network addresses that were members of the particular conference. Optionally, if any of these conference members already have a stored version of the lower quality videoconference, the stored version may be replaced with the higher quality one.

Alternatively, each of the conference members may have an icon on his screen which they may click for the purpose of re-ordering a particular conference in which they were a member. This would mean that only conference members desiring the higher quality image would receive that image for future review.

Although the preferred embodiment is described in detail as above, numerous additions and modifications are possible to a skilled person in the art without departing from the spirit of the invention. Therefore, the scope of the invention is intended to be solely limited by the following claims.

What is claimed is:

1. A videoconference system, comprising:
   a plurality of videoconference stations communicating with each other over a packet data network, each of said videoconference stations capable of generating an original videoconference signal for transmission in real-time to other of said conference stations and for recording for future use;
   each videoconference station comprising a first encoder for encoding said original videoconference signal into a first format having a first quality that is suitable for real-time streaming transmission to said other of said videoconference stations;
   at least one of said videoconference stations further comprising:
      a second encoder for encoding said original videoconference signal into a second format having a second quality that is suitable for recording; and
      a storage device for saving said videoconference signal in said second format.

2. The videoconference system of claim 1 wherein said conference signal in said second format has a higher image quality than that in said first format.

3. The videoconference system of claim 2 wherein said second encoder requires longer latency than said first encoder.

4. A videoconference station for generating an original videoconference signal to be transmitted to other videoconference stations over a packet data network, comprising:
   a first encoder for encoding said original videoconference signal into a first format having a quality suitable for real-time transmission to a conference bridge;
   a second encoder for encoding said original videoconference signal into a second format having a quality suitable for recording; and
   a recorder for recording said videoconference signal in said second format.

5. The conference station of claim 4 wherein said second encoder requires a longer latency to encode but produces a videoconference signal of higher quality than said first encoder.

6. The conference station of claim 4 wherein said second format requires less storage than in said first format.

7. The conference station of claim 6 wherein said second encoder is not in any way designed based upon latency characteristics.

8. A method of processing an original videoconference signal generated from a videoconference station in a videoconference system during a videoconference, comprising the steps of:
   encoding said original videoconference signal into a first format suitable for streaming transmission over a packet data network to other videoconference stations in said videoconference system;
   encoding said original videoconference signal into a second format having a higher quality than said first format;
   streaming in real time said videoconference signal in said first format to said other conference stations through a conference bridge over said packet data network; and
   saving said videoconference signal in said second format in a non-volatile storage for future retrieving.

9. The method of claim 8 further comprising a step of transmitting said saved videoconference signal in said second format to one or more of said other videoconference stations.

10. The method of claim 9 wherein said transmission of said saved videoconference signal in said second format is carried out at a time after said videoconference.

11. The method of claim 10 wherein said transmission of said saved videoconference signal in said second format is carried out at a time when a bandwidth between said videoconference station transmitting the signal and said one or more other videoconference stations receiving the signal is available.

12. Apparatus for transmitting and recording a signal generated at a videoconference, said apparatus comprising:

a plurality of videoconferencing terminals for communicating voice and video signals with each other;

a first encoder for encoding an original video image from one of said terminals using a first encoding algorithm to produce a first quality encoded image;

a second encoder for encoding said original video image from said one of said terminals using a second encoding algorithm to produce a second quality encoded image;

a storage system for storing said second quality encoded image;

a transmission system for transmitting said first quality encoded image to other conferees during said videoconference; and retransmission means for transmitting said second quality encoded image from said storage system to at least one remote recipient after termination of said conference.

13. The system of claim 12 wherein said retransmission system includes a record of network addresses associated with each member of a conference being stored, and wherein the retransmission system is arranged to perform retransmission to selected ones of said members at a selected time after said conference.

14. The system of claim 11 wherein the selected ones of said members includes all of said members.

15. The system of claim 11 wherein each conference terminal includes an icon which, if selected, designates that terminal to receives said retransmission.

16. The system of claim 12 wherein said retransmission occurs at a time that the transmission system is substantially idle.

17. A method of encoding a video image for use in a videoconferencing system comprising the steps of outputting an original digital video image and encoding the same original digital video image using at least two different encoders, transmitting the image encoded using a first encoder to conferees in real-time and later transmitting the image encoded using a second encoder to at least one party wherein the second encoded image is delayed by a relatively long latency.

18. The method of claim 17 wherein said image encoded using said second encoder is only transmitted to parties who request same.

19. The method of claim 18 wherein said party is a conference member.

20. The method of claim 17 wherein said image encoded using said second encoder is transmitted to all member of a videoconference.

21. The method of claim 17 wherein said image encoded using said second encoder is transmitted during a predetermined time when a network to which conference terminals are connected is less busy than when said conference takes place.

22. The method of claim 17 wherein the image encoded using the second encoder is transmitted at, but not exceeding, a specified bandwidth.

* * * * *